US005560585A

United States Patent [19]

Krimmer et al.

[11] Patent Number: 5,560,585

[45] Date of Patent: Oct. 1, 1996

[54] VALVE FOR METERING INTRODUCTION OF EVAPORATED FUEL INTO AN INDUCTION DUCT OF AN INTERNAL COMBUSTION ENGINE

[75] Inventors: Erwin Krimmer, Pluederhausen; Wolfgang Schulz, Bietigheim-Bissingen; Tilman Miehle, Fellbach, all of Germany

[73] Assignee: Robert Bosch GmbH, Stuttgart, Germany

[21] Appl. No.: 290,710

[22] PCT Filed: Dec. 3, 1993

[86] PCT No.: PCT/DE93/01151

§ 371 Date: Aug. 12, 1994

§ 102(e) Date: Aug. 12, 1994

[87] PCT Pub. No.: WO94/15091

PCT Pub. Date: Jul. 7, 1994

[30] Foreign Application Priority Data

Dec. 24, 1992 [DE] Germany .......................... 42 44 113.7

[51] Int. Cl.[6] .................................................... F16K 31/02

[52] U.S. Cl. ................................ 251/129.21; 251/129.15

[58] Field of Search ......................... 251/129.15, 129.21; 335/257; 123/520, 518

[56] References Cited

U.S. PATENT DOCUMENTS

| | | | |
|---|---|---|---|
| 4,813,647 | 3/1989 | Yagi et al. . | |
| 4,901,974 | 2/1990 | Cook et al. | 251/129.15 |
| 4,986,246 | 1/1991 | de Vivie et al. | 251/129.21 X |
| 5,069,188 | 12/1991 | Cook . | |
| 5,178,116 | 1/1993 | Fehrenbach et al. | 251/129.21 X |
| 5,237,980 | 8/1993 | Gillier | 251/129.15 X |
| 5,246,199 | 9/1993 | Numoto et al. | 251/129.15 |

*Primary Examiner*—Kevin Lee
*Attorney, Agent, or Firm*—Edwin E. Greigg; Ronald E. Greigg

[57] ABSTRACT

A tank ventilation valve suitable for metering introduction of fuel evaporated from the fuel tank of a mixture-compressing, externally ignited internal combustion engine into an induction duct of the internal combustion engine. The valve closing element has at least one damper element which protrudes through the valve closing in the axial direction and which forms a first damping surface directed towards the valve seat body on the first end surface of the valve closing element, and a second damping surface directed towards the electromagnet on the second end surface of the valve closing element so that an impact by the valve closing element on the valve seat body or on the magnet core is avoided or damped.

12 Claims, 3 Drawing Sheets

VALVE FOR METERING INTRODUCTION OF EVAPORATED FUEL INTO AN INDUCTION DUCT OF AN INTERNAL COMBUSTION ENGINE

PRIOR ART

The invention is based on a valve for metering introduction of fuel evaporated from the fuel tank of an internal combustion engine into an induction duct of the internal combustion engine. Such a valve is already known (DE 40 23 044 A1) now U.S. Pat. No. 5,178,116 in which, particularly in the case of a pulsed activation of an electromagnet influencing the valve position, disturbing operating noises can occur as a consequence of contact between metallic parts moving relative to one another.

ADVANTAGE OF THE INVENTION

The valve according to the invention has an advantage that a disturbing creation of noise is avoided when the valve is operated.

In addition, the valve according to the invention has improved wear resistance because impact between metallic parts moving relative to one another is prevented or attenuated.

Advantageous further developments and improvements to the valve given are possible by means of the measures listed hereinafter.

DRAWING

Embodiment examples of the invention are represented in a simplified manner in the drawing and are explained in more detail in the following description.

FIG. 1 shows a longitudinal section of a first embodiment example of a valve according to the invention, FIG. 2 shows a partial section of the first embodiment example corresponding to the chain-dotted line in FIG. 1 and FIG. 3 shows a partial section of a second embodiment example of a valve according to the invention; and FIG. 4 illustrates protruding bores as shown in FIG. 2 along lines IV—IV.

DESCRIPTION OF THE EMBODIMENT EXAMPLE

Figure 1:
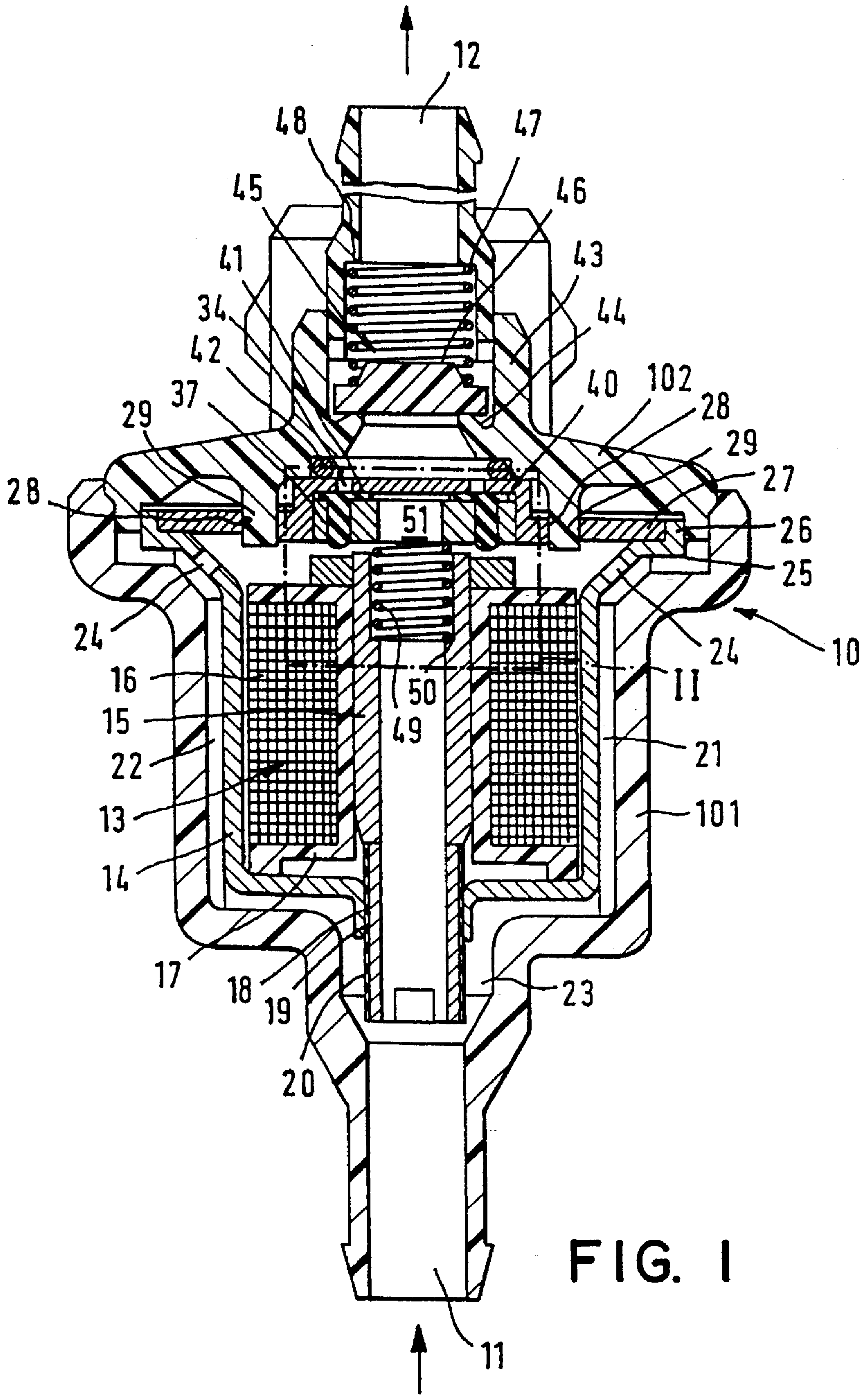

The valve represented in FIG. 1 for the metered admixture of fuel evaporated from the fuel tank of a mixture-compressing, externally ignited internal combustion engine to a fuel/air mixture supplied to the internal combustion engine via an induction duct, called a tank ventilation valve in what follows, is used in a delivery system for introducing evaporated fuel into an internal combustion engine, as is described in DE 35 19 292 A1 (U.S. Pat. No. 4,763,635). The tank ventilation valve has a two-part valve housing 10 with a cup-shaped housing part 101 and, for closing it, a cap-shaped housing part 102. The housing part 101 supports an inlet mouthpiece 11 for connection to a ventilation mouthpiece of the fuel tank or to a reservoir for the evaporated fuel, which is connected downstream of the fuel tank and is filled with active carbon, while the housing part 102 supports an outlet mouthpiece 12 for connection to the induction pipe of the internal combustion engine. Inlet mouthpiece 11 and outlet mouthpiece 12 are respectively arranged axially in the housing parts 101 and 102. An electromagnet 13 is arranged within the cup-shaped housing part 101.

The electromagnet 13 has a cup-shaped magnet housing 14 with a coaxial, hollow cylindrical magnet core 15, which penetrates the bottom of the cup, and a cylindrical excitation coil 16 which is seated on a coil carrier 17 which encloses the magnet core 15 in the magnet housing 14. A threaded mouthpiece 18, which protrudes outwards and has an internal thread 19, is integrally configured at the bottom of the magnet housing 14 and this internal thread 19 is screwed onto an externally threaded section 20 of the hollow cylindrical magnet core 15. The magnet core 15 can therefore be displaced axially, within the magnet housing 14, by rotation.

The magnet core 15 is aligned with the inlet mouthpiece 11 so that the evaporated fuel entering there passes directly into the magnet core 15 and flows through the latter. The magnet housing 14 and the magnet core 15 screwed onto it are inserted in the cup-shaped housing part 101 in such a way that axial ducts, which are offset relative to one another in the peripheral direction by the same angle, remain between the outer surface of the magnet housing 14 and the inner surface of the valve housing 10. Two diametrically opposite axial ducts 21, 22 are represented, as an example, in FIG. 1. The axial ducts 21, 22 are, on the one hand, in connection with the inlet mouthpiece 11 via an annular space 23, which remains between the valve housing 10 and the externally threaded section 20 of the magnet core 15, and are, on the other hand, in connection with the inside of the magnet housing 10 via holes 24 which are inserted in the magnet housing 14 near the open end of the magnet housing 14.

By virtue of these axial ducts 21, 22 the evaporated fuel emerging from the inlet mouthpiece also flows around the magnet housing 14 and leads away heat arising there.

The rim of the magnet housing 14 is angled towards the outside to provide an annular contact flange 25 which is bent at the end to form an axially protruding ring protrusion 26.

The contact flange 25 is used for accommodating a return yoke 27 which covers the magnet housing 14 and is in contact at its rim with the ring protrusion 26. By means of at least two fitting holes 28, the return yoke 27 is seated on retention spigots 29 which are configured in the cap-shaped housing part 102 and protrude axially on the bottom of the housing part 102 facing towards the housing part 101. During assembly of the cap-shaped housing part 102 and the cup-shaped housing part 101, the return yoke 27 is inserted as an accurate fit in the contact flange 25 with the ring protrusion 26 and is firmly clamped in it. In the return yoke 27, there is at least one valve opening 34 through which the evaporated fuel flowing through the inlet mouthpiece 11 into the cup-shaped housing part 101 can pass to the outlet mouthpiece 12. In the embodiment example of FIG. 1, two valve openings 34 are provided which can be closed by means of a valve closing element 37 arranged between the return yoke 27 and the magnet core 15. An axial passage opening 51 with a boundary wall 52 (FIGS. 2 and 3) is located centrally in the valve closing element 37 coaxially with the hollow cylindrical magnet core 15 and the evaporated fuel arriving from the inlet mouthpiece 11 can pass through this axial passage opening 51 to the outlet mouthpiece 12 when the valve opening 34 is open. The valve closing element 37 is manufactured from magnetically conducting material and simultaneously forms the armature of the electromagnet 13. The valve closing element 37 is acted on in the valve closing direction by a valve closing spring 49. The valve closing spring 49 is supported on the valve closing element 37 at one end and on an annular support shoulder 50 configured on the inner wall of the hollow cylindrical magnet core 15 at the other. The valve closing element 37 can be actuated against the force of the valve closing spring 49 away from the valve opening 34 in the valve opening direction by supplying current to the electromagnet 13.

The back of the return yoke 27 facing away from the valve closing element 37 is sealed relative to the housing part 102 by a sealing ring 42 so that leakage losses via the connection between the return yoke 27 and the magnet housing 14 are avoided. The outlet mouthpiece 12 is engaged in an accommodation mouthpiece 43 coaxially formed on the housing part 102. A valve seat 44 of a non-return valve 45 can be configured in the accommodation mouthpiece 43 on a radially inwardly protruding annular shoulder and a valve body 46 is pressed onto the valve seat 44 by a valve spring 47. The valve spring 47 is supported on an abutment 48 provided in the outlet mouthpiece 12. The non-return valve 45 is particularly necessary when the tank ventilation valve is to be inserted in so-called supercharged engines.

Figure 2:
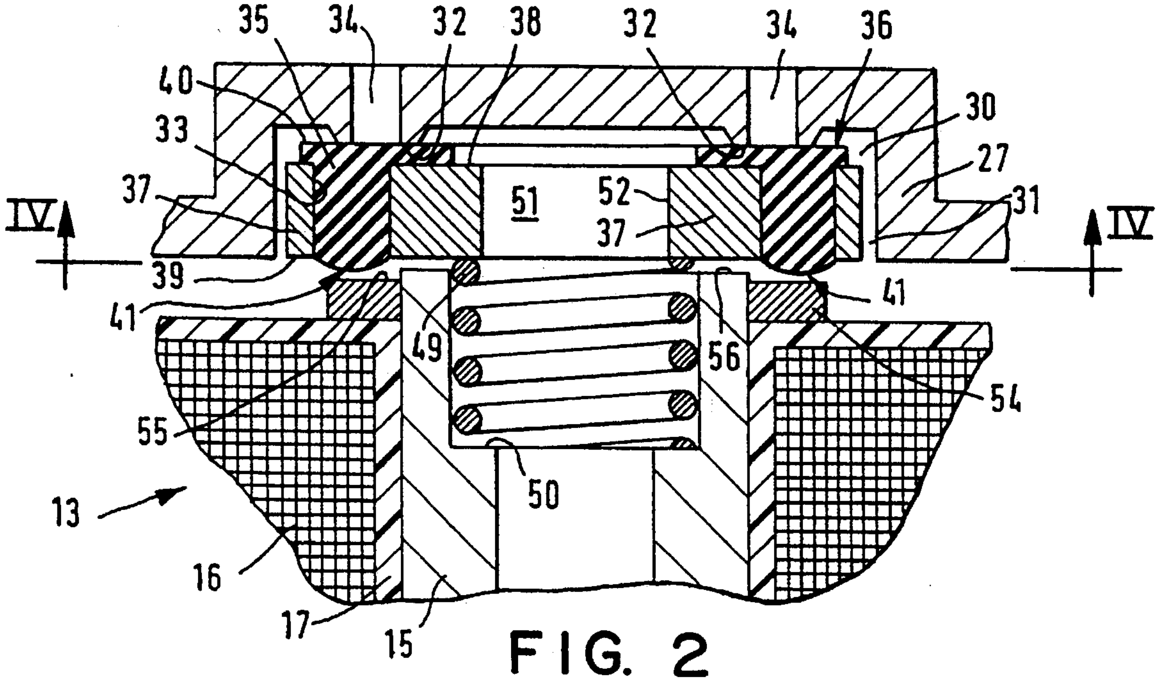

FIG. 2 shows a partial section of the first embodiment example, shown in FIG. 1, of a tank ventilation valve according to the invention, corresponding to the chain-dotted line in FIG. 1. The hollow cylindrical magnet core 15 of the electromagnet 13 is surrounded by the exciter coil 16 located on the coil carrier 17. The valve closing spring 49 acting on the valve closing element 37 is supported on the support shoulder 50. On its end directed towards the magnet core 15, the return yoke 27 has a cylindrical depression 30 in the axial direction. The valve closing element 37, which is configured in plate-shape or disc-shape, protrudes into the depression 30 and has a somewhat smaller diameter than the depression 30 so that a radial gap 31 remains between the periphery of the valve closing element 37 and wall of the depression 30. The radial gap 31 is dimensioned in such a way that the valve closing element 37 is guided by its periphery in the depression 30 so that it can be displaced axially. In the region of the (for example) two valve openings 34, two raised valve seats 32 are configured on the bottom surface of the depression 30 and these form a valve double seat. The return yoke 27 has, in consequence, the function of a valve seat body of the tank ventilation valve.

Figure 4:
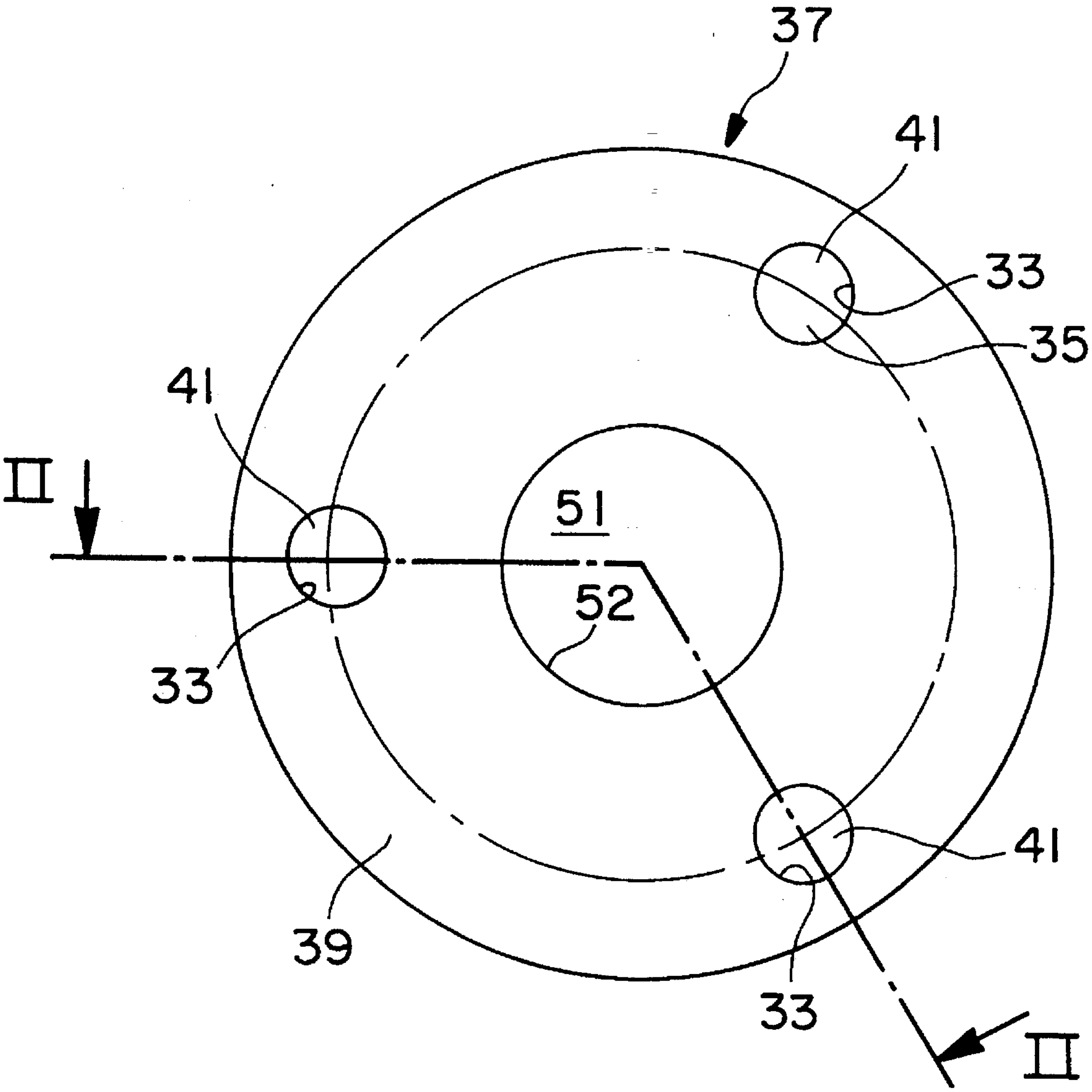

At least three axial passage holes 33 are arranged in the valve closing element 37 and these are located at the same distance from one another on a hypothetical circle as shown in FIG. 4. A damper element 35 protrudes through the passage holes 33. The damper element 35 extends in the radial direction and in the peripheral direction on a first end surface 38, directed towards the valve double seat 32, of the valve closing element 37 over at least a partial region 36 which is at least as large as the at least one valve seat 32 configured on the valve seat body 27. The partial region of the damper element 35 extending over the first end surface 38 of the valve closing element 37 seals, in the valve closing position, the valve openings 34 and damps an impact, resulting from the force of the valve closing spring 49, of the valve closing element 37 from the valve open position onto the valve seat 32 after the flow has been switched off. The damper element 35 simultaneously forms, in consequence, a first damping surface 40 on the first end surface of the valve closing element 37.

On a second end surface 39, directed towards the magnet core 15, of the valve closing element 37, the damper element 35 protrudes in a hump-like manner beyond the outer contour of the valve closing element 37 in the region of the passage holes 33. In consequence, the damper element 35 forms partial damping surfaces, which together provide a second damping surface 41, on the second end surface 39 in the region of the passage holes 33. When sufficient current is supplied to the electromagnet 13, the second damper surface 41 of the damper element 35 is in contact with a stop surface 55 formed by a stop body 54. In this way, a metallic impact of the second end surface 39 of the valve closing element 37 on an opposite end surface 56 of the magnet core 15 can be prevented or damped.

The stop body 54 is, for example, configured in the form of a ring and is pressed onto the end of the magnet core 15.

The contact surface 55, together with the end surface 56, can be axially adjusted, by means of the setting thread formed by the internal thread 19 and the external thread section 20 (FIG. 1), by rotating the magnet core 15. A larger or smaller axial gap can, in consequence, be formed between the stop body 54 and the coil body 17.

The damper element 35 is formed from a rubber-type material which can be connected to the valve closing element 37 by vulcanizing. The damping effect of the damper element 35 is based, in particular, on the occurrence of internal friction during a deformation of the damper element 35 caused by impact. An unfavourable effect on the magnet field geometry of the tank ventilation valve can be avoided by, for example, the configuration of the stop ring 54 from non-magnetic material. Otherwise, the contact surface 55 can also be formed by the magnet core 15 itself.

Figure 3:
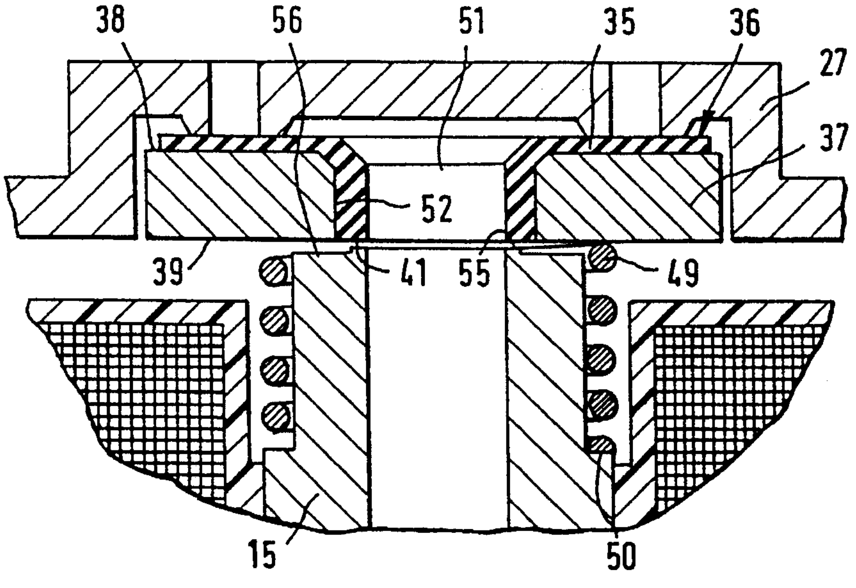

FIG. 3 shows, in a partial section, a second embodiment example of the tank ventilation valve according to the invention. Similar and similarly acting parts are characterized by the same reference signs as in FIGS. 1 and 2. An essential difference relative to the first embodiment example consists in the arrangement of the damper element 35 and the valve closing spring 49. In this case, the damper element 35 likewise extends over the partial region 36 which is at least as large as the at least one valve seat 32 configured on the valve seat body 37. Starting from the first partial region 36, the damper element 35 extends radially inwards as far as the passage opening 51 and, from there, axially along the boundary wall 52, lining the passage opening 51, as far as the second end surface 39 of the valve closing body 37. It terminates there axially flush with the second end surface 39 and forms the second damping surface 41 there. On its second damping surface 41, the damper element 35 can like-wise, for example, have a hump-like configuration and/or protrude beyond the outer contour of the valve closing element 37.

Opposite to the second damping surface 41, there is a shoulder protruding in the axial direction on the end surface 56 of the magnet core 15 and this shoulder acts as the contact surface 55 for the second damping surface 41. In FIG. 3, the valve closing spring 49 encloses the magnet core 15, which at least partially protrudes through it. The support shoulder 50 is likewise arranged on the outer periphery of the magnet core 15. The guide stability of the valve closing element 37 in the valve support body 27 can be increased, relative to the internally located arrangement of FIGS. 1 and 2, by the arrangement of the valve closing spring 49 outside the magnet core 15 and the increase in its diameter associated with this.

We claim:

1. A valve for metering introduction of evaporated fuel from a fuel tank of an internal combustion engine into an induction duct of the internal combustion engine, having a valve closing element (37) including an axial passage which is arranged between a return yoke (27) and a magnet core of an electromagnet, said return yoke has at least one passage opening, said valve closing element has a first end surface directed towards the return yoke and a second end surface directed towards the electromagnet, said valve closing element is acted on by a valve closing spring (49) in the valve closing direction and said valve closing element is actuated by the electromagnet in the valve opening direction, said first end surface of said valve closing element being held pressed against at least one valve seat (32) on said return yoke, with at least one valve opening, configured on the return yoke when no current is supplied to the electromagnet and taking up a valve open position when increasing current is supplied to the electromagnet, at least one damper element (35) is provided on the valve closing element (37) radially of the axial passage, said at least one damper element (35) protrudes in an axial direction through the valve closing element (37) and forms a first damping surface (40) outwardly of said axial passage directed towards the return yoke (27) on the first end surface (38) of the valve closing element (37) and forms a second damping surface (41) directed towards the electromagnet (13) on the second end surface (39) of the valve closing element (37), said first damping surface (40) being in contact with the at least one valve seat (32) when no current is supplied to the electromagnet (13) and said second damping surface (41) being in contact with a stop surface (55) when sufficient current is supplied to the electromagnet (13).

2. The valve as claimed in claim 1, wherein the first damping surface (40) of the damper element (35) extends over a partial region (36) of the first end surface (38) of the valve closing element (37), which partial region is at least as large as the at least one valve seat (32) configured on the return yoke (27) so that the damper element (35) is pressed against the return yoke (27) by the valve closing spring (49) and the valve closing element (37) when no current is supplied to the electromagnet (13) and closes the at least one valve opening (34) configured in the return yoke (27).

3. The valve as claimed in claim 2, wherein the valve closing spring (49) concentrically encloses the magnet core (15) at least partially and the damper element (35) extends in the axial direction with a sleeve-shaped part, said sleeve-shaped part starting from the first partial region (36), along a boundary wall (52) of the passage opening (51) arranged in the valve closing element (37) approximately as far as the second end surface (39).

4. The valve as claimed in claim 2, wherein at least three passage holes (33) located at the same distance from one another on a hypothetical circle are configured in the valve closing element (37) and the damper element (35) protrudes through each of said three passage holes starting from the first end surface (38), the damper element (35) protruding in each case on the second end surface (39) of the valve closing element (35) beyond the outer contour of the valve closing element (37) and there forming partial damping surfaces of the second damping surface (41) corresponding to the number of passage holes (33).

5. A valve for metering introduction of evaporated fuel from a fuel tank of an internal combustion engine into an induction duct of the internal combustion engine, having a valve closing element (37) which is arranged between a return yoke (27) and a magnet core of an electromagnet, said return yoke has at least one passage opening, said valve closing element has a first end surface directed towards the return yoke and a second end surface directed towards the electromagnet, said valve closing element is acted on by a valve closing spring (49) in the valve closing direction and said valve closing element is actuated by the electromagnet in the valve opening direction, said first end surface of said valve closing element being held pressed against at least one valve seat (32) on said return yoke, with at least one valve opening, configured on the return yoke when no current is supplied to the electromagnet and taking up a valve open position when increasing current is supplied to the electromagnet, at least one damper element (35) is provided on the valve closing element (37), said damper element (35) protrudes in an axial direction through the valve closing element (37) and forms a first damping surface (40) directed towards the return yoke (27) on the first end surface (38) of the valve closing element (37) and forms a second damping surface (41) directed towards the electromagnet (13) on the second end surface (39) of the valve closing element (37), said first damping surface (40) being in contact with the at least one valve seat (32) when no current is supplied to the electromagnet (13) and said second damping surface (41) being in contact with a stop surface (55) when sufficient current is supplied to the electromagnet (13), the first damping surface (40) of the damper element (35) extends over a partial region (36) of the first end surface (38) of the valve closing element (37), which partial region is at least as large as the at least one valve seat (32) configured on the return yoke (27) so that the damper element (35) is pressed against the return yoke (27) by the valve closing spring (49) and the valve closing element (37) when no current is supplied to the electromagnet (13) and closes the at least one valve opening (34) configured in the return yoke (27), the valve closing spring (49) concentrically encloses the magnet core (15) at least partially and the damper element (35) extends in the axial direction with a sleeve-shaped part, said sleeve-shaped part starting from the first partial region (36), along a boundary wall (52) of the passage opening (51) arranged in the valve closing element (37) approximately as far as the second end surface (39).

6. The valve as claimed in claim 5, wherein the stop surface (55) is formed by an end surface (56) of the magnet core (15).

7. The valve as claimed in claim 5, wherein the stop surface (55) is formed by a stop body (54) connected to the magnet core (15).

8. The valve as claimed in claim 7, wherein the stop body (54) is manufactured from non-magnetic material.

9. A valve for metering introduction of evaporated fuel from a fuel tank of an internal combustion engine into an induction duct of the internal combustion engine, having a valve closing element (37) which is arranged between a return yoke (27) and a magnet core of an electromagnet, said return yoke has at least one passage opening, said valve closing element has a first end surface directed towards the return yoke and a second end surface directed towards the electromagnet, said valve closing element is acted on by a valve closing spring (49) in the valve closing direction and said valve closing element is actuated by the electromagnet in the valve opening direction, said first end surface of said valve closing element being held pressed against at least one valve seat (32) on said return yoke, with at least one valve opening, configured on the return yoke when no current is supplied to the electromagnet and taking up a valve open position when increasing current is supplied to the electromagnet, at least one damper element (35) is provided on the valve closing element (37), said damper element (35) protrudes in an axial direction through the valve closing element (37) and forms a first damping surface (40) directed towards the return yoke (27) on the first end surface (38) of the valve closing element (37) and forms a second damping surface (41) directed towards the electromagnet (13) on the second end surface (39) of the valve closing element (37), said first damping surface (40) being in contact with the at least one valve seat (32) when no current is supplied to the electromagnet (13) and said second damping surface (41) being in contact with a stop surface (55) when sufficient current is supplied to the electromagnet (13), the first damping surface (40) of the damper element (35) extends over a partial region (36) of the first end surface (38) of the valve closing element (37), which partial region is at least as large as the at least one valve seat (32) configured on the return yoke (27) so that the damper element (35) is pressed against the return yoke (27) by the valve closing spring (49) and the valve closing element (37) when no current is supplied to the electromagnet (13) and closes the at least one valve opening (34) configured in the return yoke (27), at least three passage holes (33) located at the same distance from one another on a hypothetical circle are configured in the valve closing element (37) and the damper element (35) protrudes through each of said three passage holes starting from the first end surface (38), the damper element (35) protruding in each case on the second end surface (39) of the valve closing element (35) beyond the outer contour of the valve closing element (37) and there forming partial damping surfaces of the second damping surface (41) corresponding to the number of passage holes (33).

10. The valve as claimed in claim 9, wherein the stop surface (55) is formed by an end surface (56) of the magnet core (15).

11. The valve as claimed in claim 9, wherein the stop surface (55) is formed by a stop body (54) connected to the magnet core (15).

12. A valve for metering introduction of evaporated fuel from a fuel tank of an internal combustion engine into an induction duct of the internal combustion engine, having a valve closing element (37) which is arranged between a return yoke (27) and a magnet core of an electromagnet, said return yoke has at least one passage opening, said valve closing element has a first end surface directed towards the return yoke and a second end surface directed towards the electromagnet, said valve closing element is acted on by a valve closing spring (49) in the valve closing direction arid said valve closing element is actuated by the electromagnet in the valve opening direction, said first end surface of said valve closing element being held pressed against at least one valve seat (32) on said return yoke, with at least one valve opening, configured on the return yoke when no current is supplied to the electromagnet and taking up a valve open position when increasing current is supplied to the electromagnet, at least one damper element (35) is provided on the valve closing element (37), said damper element (35) protrudes in an axial direction through the valve closing element (37) and forms a first damping surface (40) directed towards the return yoke (27) on the first end surface (38) of the valve closing element (37) and forms a second damping surface (41) directed towards the electromagnet (13) on the second end surface (39) of the valve closing element (37), said damper element (35) comprising a rubber-type material which is connected to the valve closing element (37) by vulcanizing, said first damping surface (40) being in contact with the at least one valve seat (32) when no current is supplied to the electromagnet (13) and said second damping surface (41) being in contact with a stop surface (55) when sufficient current is supplied to the electromagnet (13).

* * * * *